Feb. 24, 1942.   J. H. L'ABÉE-LUND   2,274,073
COMPASS
Filed Aug. 8, 1939
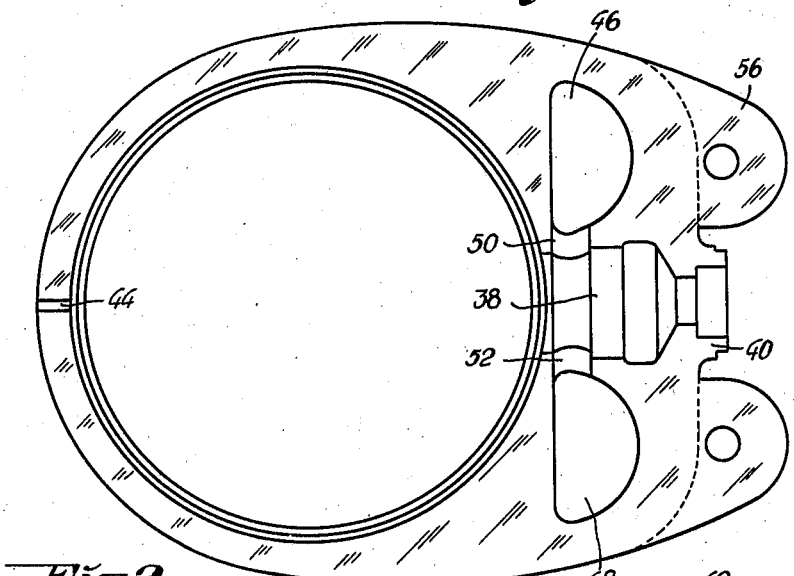
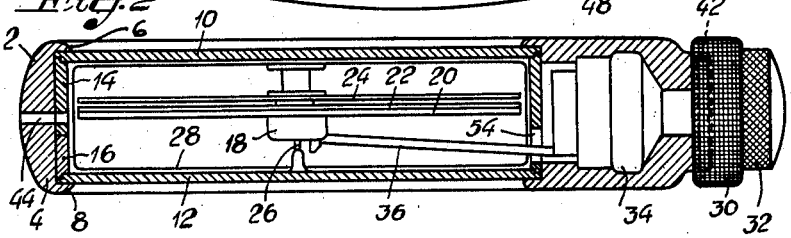
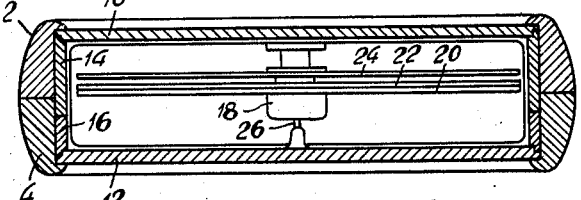
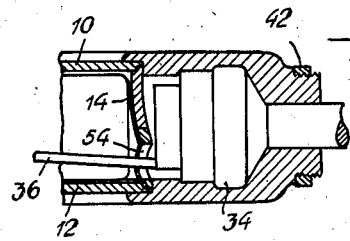
Inventor
Johan Henrik L'Abée-Lund Patented Feb. 24, 1942

2,274,073

UNITED STATES PATENT OFFICE 2,274,073

COMPASS

Johan Henrik L'Abée-Lund, Oslo, Norway, assignor to L'Abée-Lund Aktieselskab, Oslo, Norway, a corporation of Norway Application August 8, 1939, Serial No. 289,037
In Sweden August 13, 1938

9 Claims. (Cl. 33—223)

The present invention relates to a pocket compass and has for its object to provide a casing therefor which has an attractive appearance and also is simple and cheap in manufacture.

According to the invention the casing forming the exterior shape of the compass consists substantially of two halves which are rigidly connected to each other. These halves may be moulded, cast, or pressed in one and the same mould. Suitably, the halves are made from a plastic or artificial compound, such as Bakelite, which is capable of being moulded, cast, or pressed, and they may be secured to each other by pasting or glueing and, simultaneously, form a closed container for the liquid in the compass in case of a liquid compass.

Further features of the invention will be clear from the following description of the embodiment of a compass according to the invention illustrated by way of example in the accompanying drawing, in which Fig. 1 is a view of one half of the compass casing, prior to assembling the compass, and Figs. 2 and 3 are cross-sectional views taken at right angles to each other through the compass assembled according to the invention.

Fig. 4 is a sectional view illustrating a detail.

The compass illustrated in the drawing has a casing which substantially determines the exterior shape of the compass and forms a rigid and pressure resistant protection therefor. It consists of two identical halves 2 and 4 each of which has the appearance shown in Fig. 1. These halves are suitably cast, moulded, or pressed in one and the same mould. The material in the halves consists of a plastic capable of being moulded or pressed, preferably a condensation product of phenols and aldehydes, such as Bakelite. Other artificial compounds may also be used, such as for example, gallalith, masonite, particularly hardened one, natural or synthetic rubber and so on. Possibly, the material may be translucent and consist of Celluloid, cellon, artificial glass, such as plexiglass or beetle (anureaformaldehyde compound) in which case a particular protection glass above the oscillatory system may be omitted. To protect the part of the casing positioned in the field of sight from becoming scratched a protection glass may be provided in the outer surface thereof and mounted to engage and to be joined with the artificial glass over the whole surface thereof. Where plexiglass is used, only the portion opposite to and above the compass system may be translucent, and the remainder of the casing may be coloured black. It is also possible to use light metal, such as alloyed aluminium or electron.

The halves of the casing are limited at one side by a plane surface by means of which they engage each other so as to form a closed chamber therebetween. Suitably, the connection of the halves may be effected by gluing or pasting along their plane surfaces but it is also possible to connect them with each other by screws or rivets, the halves having opposite through holes or apertures for receiving the screws or rivets. Additional holes for guide pins may be provided; such holes are not necessarily through holes.

The halves 2 and 4 have inwardly projecting flanges 6 and 8, respectively, by which they embrace the periphery of the glass cover 10 and the glass bottom 12, respectively. Between these two glasses there is inserted an annulus which is suitably divided into two parts 14 and 16, one of which is of greater length than the other, as counted in the axial direction, whereby the joint therebetween will have a non-registering position to the joint between the two halves 2 and 4 of the casing. As a result, the greater annulus will serve as a guide for assembling the two halves of the casing. If desired, a corresponding annulus may be placed in grooves positioned in the body of the casing so as to extend in opposite directions from the joint between the halves. The annuli 14 and 16 serve to press the glasses 10 and 12 against the flanges 6 and 8. The annuli 14 and 16 may be provided with outer screw threads which cooperate with corresponding threads in the halves of the casing. Due to such threads the glasses may be fixed in position and the halves of the casing may be screwed together with each other. The same result may be obtained by a single annulus which is not divided axially.

The inside of the chamber formed by the glasses 10 and 12 and the annuli 14 and 16 has positioned thereon the oscillatory compass system which consists, in the present case, of a hub 18 having mounted thereon a magnet 20, a compass rose 22, and a travel direction indicator 24 which are rotatable relatively to each other. The system is carried by the pivot 26 secured in the glass bottom. 28 designates a continuous lac coating which serves as a seal. The three adjustable parts of the system may be adjusted and the entire system may be locked by means of two outer adjusting handles 30 and 32 made from Bakelite, rubber or the like and from which the movement is brought over by a motion transmitting means 34 of a construction not particularly described herein to a shaft and a stop bar 36 positioned inside the compass.

The inner side of each half has arranged therein a recess 38 the shape of which corresponds to the shape of the motion transmitting means 34 and which suitably consists of half-circular or half-conical sections. The means 34 may also have outer screw threads formed on a cylindrical part and corresponding threads may be provided in the surface of the recess 38. Suitably, the material in some parts of the means 34 is of the same kind as that of the casing or at least of the same coefficient of expansion as the latter to facilitate the sealing and to prevent the generation of cracks. The halves of the casing embrace the means 34 and thereby fix the position thereof and of the elements mounted therein. Between the means 34 and the recess 38 provided therefor there is a thin layer of a sealing means, such as an adhesive. As a result, the casing forms simultaneously a tight container for a liquid in the compass. The casing has a tubular projection 40 embracing the means 34 and having one half thereof integral with one half of the casing and the other half integral with the other half of the casing. Pressed onto and around the projection thus formed is a ring 42 which provides for a proper connection of the halves of the casing with each other. The projection 40 and the ring 42 may be screw-threaded, if desired. In such case, the ring 42 may be connected with the means 34.

The opposite side of the casing has provided therein, in the joint between the two halves, a passage 44 which may contain a particular tube by which the compass may be filled with liquid. Said tube is closed by a suitable stopper.

At each side of the recess 38 the inner side of each of the casing halves has two cavities 46 and 48 which are partly filled with air or gas and which serve as an expansion chamber. Said cavities communicate with the liquid container proper, i. e. the space between the glasses 10 and 12 and within the annuli 14 and 16, by passages 50 and 52, the recess 38, and an aperture 54 in the annulus 16. The annuli 14 and 16 form a partition between the liquid container and the expansion chamber so as to prevent air from being transmitted from the latter to the former when the compass is held in its operative position. On the other hand, when the compass is held so as to have the handles 30 and 32 directed upwardly, air blisters which may have entered into the liquid container are brought over to the expansion chambers through the aperture 54. To facilitate this and render the air blisters to be brought over to the expansion chambers automatically each time the compass is put into the pocket, the annulae 14 and 16 may be conical to some extent or bulged adjacent to the aperture 54 as illustrated in Fig. 4 so as to form a funnel which catches and conducts the air blisters into the expansion chambers. From the expansion chambers 46 and 48 there may be provided further passages which open into the liquid container near the sides of the compass and serve to facilitate the flow of liquid back from the expansion chamber.

As illustrated in Fig. 1, the compass casing, as looked in a top view, is approximatively oval, the field of sight of the compass determined by the glasses 10 and 12 being positioned in connection with one rounded end of the casing. The halves of the casing may also be said to form a ring around the circular protection glass, about half of the periphery of said ring being relatively thin, whereas the remainder thereof becomes broader towards the motion transmitting means 34 to embrace said means by a rather considerable breadth and to give place for the expansion chambers 46 and 48. At each side of the projection 40, each half of the casing has projecting therefrom perforated ears or lips 56 by which the compass may be connected to a carrying strap.

The construction hereinbefore described and shown in the drawing may, of course, be modified in many respects. The protection glasses may be fixed, for instance, into the casing from the outer side thereof and be clamped by a metal ring which is extended into a groove having somewhat greater diameter than that of the protection glass. It is also possible to secure the glass in the casing by moulding if the casing is made from Bakelite or a similar material. If the casing is made from rubber, the protection glasses as well as the motion transmitting means 34 may be forced into their places. In this case it is not necessary to divide the casing into two halves to enable the assembly of the compass.

If the casing is made from a plastic capable of being cast, moulded, or pressed, the present invention also includes the possibility of giving the two halves of the casing different shape. For example, the bottom half may be provided with a continuous bottom of the same material as the remainder of the casing and only the top part be provided with a protection glass (Fig. 4). However, the two halves are connected also in this case along a plane surface which is parallel to the plane of oscillation of the compass magnet. On the other hand, it is possible to have the joint between the halves situated otherwise, as for instance at right angles to the plane of oscillation of the magnet and parallel to the longitudinal central line of the compass. To form a guide for the halves of the casing one thereof may further be provided with a projecting flange which engages a corresponding recess in the other half.

Furthermore, it is to be noted that the invention is not limited to such an assembled compass system as that shown in the drawing but also relates to a compass having a single compass needle. In this case, the casing is passed by a stop bar which, however, could also be dispensed with. The two halves of the compass casing may be circular or approximatively circular in such case.

What I claim is:

1. In a magnetic compass, a top half, a bottom half identical with said top half and forming the compass casing together therewith, a liquid in said casing, a compass magnet mounted to oscillate in said liquid, means to joint said halves to each other along a plane surface parallel to the plane of oscillation of the magnet, a protection glass in both the top half and the bottom half, an integral flange on said top half and on said bottom half encircling said glass at the periphery thereof to secure them to the casing, and means closely fitting the interior surface of said casing and peripherally engaging said glass to maintain the latter in position against its adjacent flange, said last mentioned means also constituting a guide for assembling the halves of the casing.

2. In a magnetic compass, two identical halves forming the casing of the compass, a liquid in said casing, a compass magnet mounted to oscillate in said liquid, means joining said halves to each other along a plane surface parallel to the oscillatory plane of the magnet, and annular means closely fitting the interior surface of said casing and constituting a guide for assembling the halves of the casing.

3. In a magnetic compass, a top half, a bottom half identical with the top half, means for connecting said halves to each other, said halves forming a casing having a compass chamber therein, a liquid in said chamber, a compass magnet mounted to oscillate in said liquid, a protective transparent member in one half of the casing, said casing having an integral flange encircling said transparent member at the periphery thereof, and means closely fitting the interior surface of the casing and peripherally engaging said transparent member to maintain the latter in position against said flange, said last mentioned means also constituting a guide for assembling the halves of the casing.

4. In a magnetic compass, a top half, a bottom half substantially identical with said top half and forming the compass casing together therewith, a liquid in said casing, a compass magnet mounted to oscillate in said liquid, means to join said halves to each other along a plane surface parallel to the plane of oscillation of the magnet, a protective glass in each half, integral flanges on said halves encircling said glasses at the periphery on the outside thereof, and an annulus inserted in said halves between said glasses to retain each glass in liquid sealing contact with its respective flange and providing a guide for assembling the halves of the casing.

5. Magnetic compass as claimed in claim 4, and having the annulus divided so as to form two annuli having different axial dimensions, whereby the joint between said annuli have a non-registering positive relative to the joint between the two halves of the casing, said annulus constituting a guide for assembling the halves of the casing.

6. In a magnetic compass, two halves forming the casing of the compass, upper and lower bezels therefor, a liquid in said casing, a compass magnet mounted to oscillate in said liquid, means joining said halves to each other along a plane substantially parallel to the plane of oscillation of the magnet, means closely fitting the interior surface of the casing and forming in conjunction with said bezels a closed compass chamber for the liquid, the halves of the casing having confronting cavities adjacent the compass chamber and communicating with the interior of said chamber whereby when the halves are joined the confronting cavities coact to form expanding chambers for the liquid in said casing.

7. In a magnetic compass, two halves forming the casing of the compass, upper and lower bezels therefor, a liquid in said casing, a compass magnet mounted to oscillate in said liquid, means joining said halves to each other along a plane substantially parallel to the plane of oscillation of the magnet, means closely fitting the interior surface of the casing and forming in conjunction with said bezels a closed compass chamber, said means also constituting guides for assembling the halves of the casing, motion transmitting means in said casing, and outer adjusting members cooperating with said motion transmitting means for transmitting arresting motion to the magnet.

8. In a magnetic compass, a substantially oval-shaped casing having two identical halves, a liquid in said casing, a compass magnet mounted to oscillate in said liquid, means joining said halves to each other along a plane surface parallel to the oscillatory plane of the magnet, a protective transparent member in one half of the casing, said casing having an integral flange encircling said transparent member at the periphery thereof, means closely fitting the interior surface of the casing and engaging said transparent member to maintain the latter in position against said flange, and means for transmitting arresting motion to the magnet through the casing.

9. In a magnetic compass, a substantially oval-shaped casing having two identical halves, a liquid in said casing, a compass magnet mounted to oscillate in said liquid, means joining said halves to each other along a plane surface parallel to the oscillatory plane of the magnet, a protective transparent member in one half of the casing, said casing having an integral flange encircling said transparent member at the periphery thereof, means closely fitting the interior surface of the casing and engaging said transparent member to maintain the latter in position against said flange, each half of said casing having spaced ears, and means disposed in the casing between said ears and operatively connected to the magnet for transmitting arresting motion thereto.

JOHAN HENRIK L'ABÉE-LUND.